Nov. 23, 1937.　　　G. A. F. WINCKLER　　　2,099,878
AUTOMATIC ELECTRIC SAFETY LIGHT FOR LIFEBOATS
Filed Oct. 29, 1934　　　2 Sheets-Sheet 1
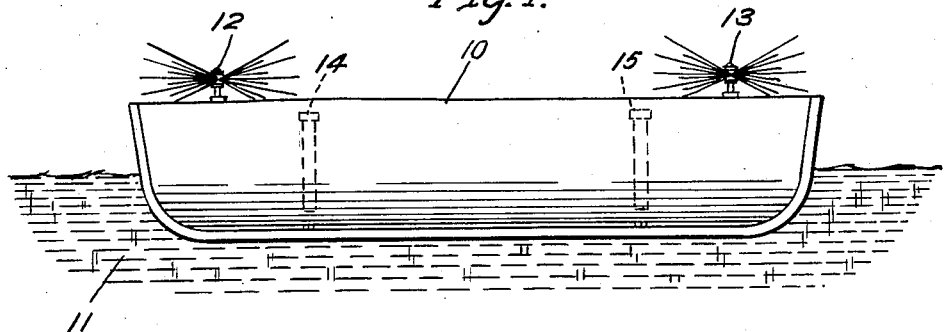
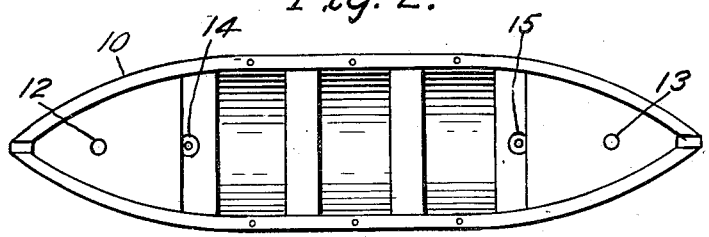
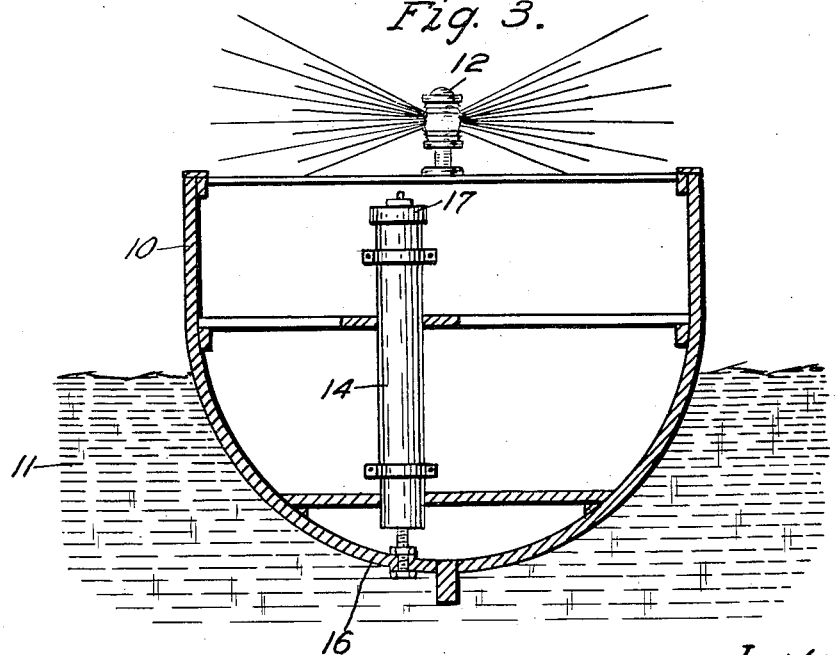
Inventor,
Gunnar A F Winckler,
by Frank G Hattie
Attorney.

Nov. 23, 1937.  G. A. F. WINCKLER  2,099,878
AUTOMATIC ELECTRIC SAFETY LIGHT FOR LIFEBOATS
Filed Oct. 29, 1934  2 Sheets-Sheet 2
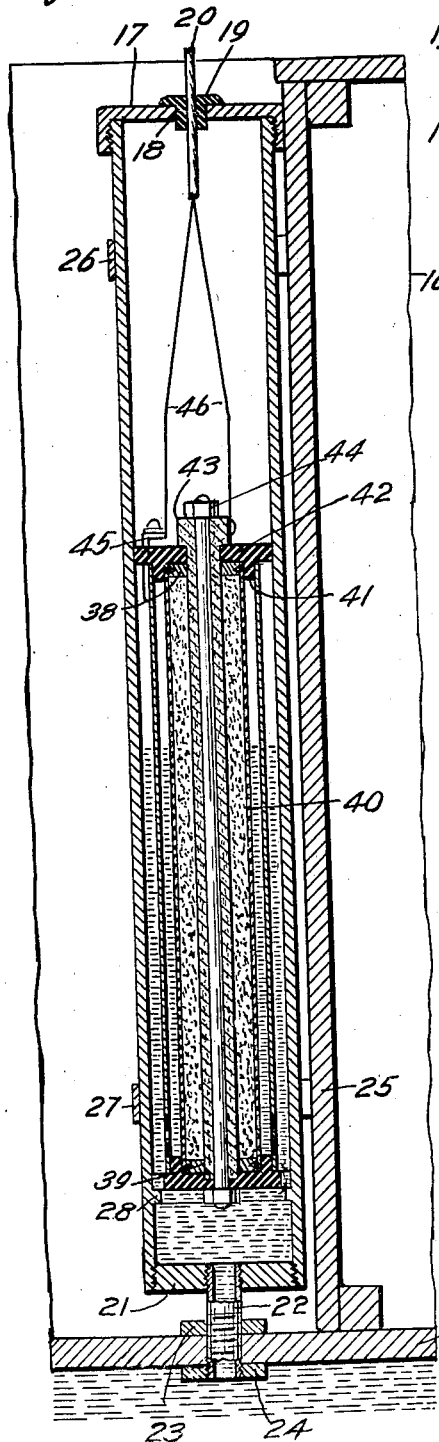
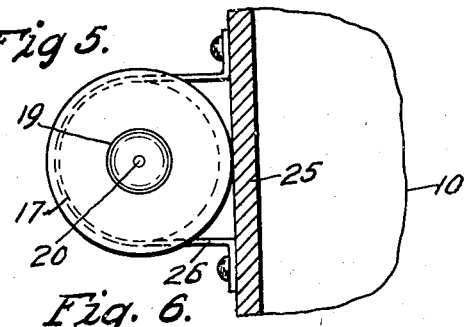
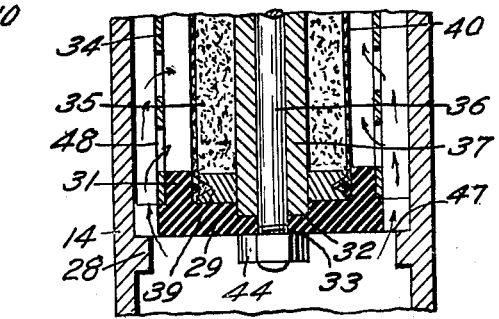
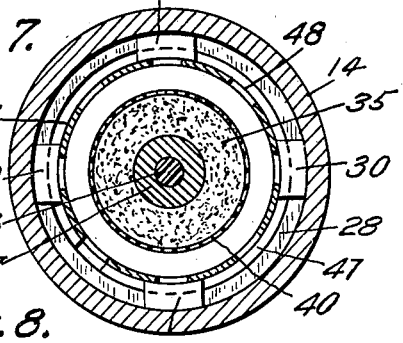
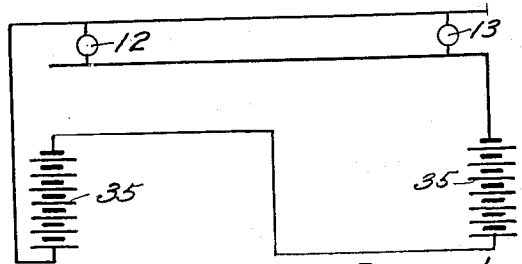
Inventor,
Gunnar A. F. Winckler,
by Frank G. Hattis,
Attorney.

Patented Nov. 23, 1937

2,099,878

UNITED STATES PATENT OFFICE 2,099,878

AUTOMATIC ELECTRIC SAFETY LIGHT FOR LIFEBOATS

Gunnar A. F. Winckler, Worcester, Mass., assignor to Winckler Engineering Laboratories Incorporated, Boston, Mass., a corporation of Massachusetts Application October 29, 1934, Serial No. 750,525

1 Claim. (Cl. 9—1)

The invention relates to an automatic electric safety light for illuminating boats, especially of the life boat type, of which the following is a specification.

The invention consists of an illuminated life boat equipped with electric lamps which permit the boat to be located when launched into the sea, especially on a dark night during a period of disaster, to ensure the safety of persons being transferred from a sinking ship or embarking in the boat for any other reason.

It is well known that when a ship is in distress life boats are launched over the sides of the vessel, and if it is dark so that persons cannot see either the boat or what they are doing, untold numbers are lost at sea due to insufficient equipment. To obviate this condition, automatically lighted lamps are provided on the life boats, which lights will only light when the boat enters the water, and will go out when the boat is taken out of the water. These lights also permit a person floating in the water to see the boat, which will facilitate his rescue.

The lamps are connected to an electrical generator of the sea water type located in a well secured to the boat. The lower end of the well is provided with a pipe which extends through the boat, which allows the water of the sea to enter and serve as an electrolytic fluid to energize the positive and negative poles of the generator. The generator is provided with an electrical circuit connected to the lamp, which circuit causes the lamp to light when the boat enters the water.

Life boats are stored on ships of all types to be used for emergency purposes in time of distress. The invention is especially adapted for these emergency conditions when the boat is lowered into the water, for the lamp will instantly light and will fix the position of the boat.

The automatically illuminated boat is a safeguard which will satisfy all marine emergencies and which will tend to prevent persons from being left to the mercy of the sea.

The object of the invention is to provide automatically lighted lamps for life boats, connected to generators having a maximum life and which will light the lamps automatically when the boats enter the water.

Referring to the figures:

Fig. 1 is a side elevation of a boat floating in the water with the automatic lighting lamps in position and in operation.

Fig. 2 is a plan view of the same.

Fig. 3 is a cross-section of the boat illustrating the generator and well.

Fig. 4 is a vertical section of the well and generator secured in position.

Fig. 5 is a plan view of the same.

Fig. 6 is an enlarged cross-section of the position of the well and generator showing how the generator is supported in the well, and showing the path of the water as it enters the well to immerse the generator.

Fig. 7 is a cross-section of the same.

Fig. 8 is a diagram of connections from the generator to the lamps.

Referring to the drawings illustrating my novel automatic electrical lighting device for life boats, the life boat is indicated at 10. The life boat is shown floating on the water of the salt seas 11. The life boat is provided with an air-tight compartment of the kind in common use on boats of this type. Mounted on the upper surface of the air-tight compartment are the lamps 12 and 13. The lamps are connected to an electrical generator located in the wells 14 and 15, both of which are rigidly secured to the bottom 16 of the boat. The wells 14 and 15 preferably are cylindrical in shape and are provided with a cover 17 shown as threaded into the upper extremity. A hole 18 is machined in the cover which cover is provided with an insulating bushing 19 through which the cable 20 passes. The cable is a part of the electric circuit and is connected to the lamps 12 and 13. The lower ends of the wells 14 and 15 are provided with a water-tight cover 21 shown as threaded in the inner surface of the well member. Seated as by threading into the cover 21 are one or more pipes 22 which extend through the bottom 16 of the boat. The lower ends of the pipes 22 are shown as threaded and as adapted to receive the holding and packing nuts 23 and 24. This construction prevents the water from leaking through from the airtight compartments into the boat, but allows the water to enter the wells and to immerse the poles of the generator when the boat is launched into the water. When the boat is removed from the water, the water in the well will run out and will cause the light to go out, and vice versa. By this construction the lamps 12 and 13 are lighted automatically when the boat is placed in the water and will go out automatically when the boat is removed from the water.

The wells 14 and 15 are held rigidly in position on the partition 25 by suitable means such as the clamp bands 26 and 27.

Preferably integral with the inside of the well casing is an annular projection 28 for supporting the generator. As the constructions are identical in form a description of one will be sufficient.

Mounted on the support 28 (Figs. 4 and 6) is an insulating disc 29 provided with projections 30 (Fig. 7) on its outer edge which rest against the inside surface of the well to hold the generator in position. Also formed on the disc 29 is an annular upstanding projection 31 which extends upwardly and determines the position of the generator elements. Formed in the center of the disc 29 is a circular depression 32 and hole 33 for supporting the inner structure of the generator as a unit. Supported on the disc 29 are the elements of the generator. Located on the outside surface of the annular projection 31 is the casing 34 of the generator which serves as the negative pole. The positive pole 35 of the generator consists of a circular rod 36 made of insulating material. The rod extends through a hole in the carbon tube 37 which is adapted to receive the discs 38 and 39. The discs 38 and 39 are provided with V-shaped depressions on their edges which allows a cloth container 40 to be secured in position as a container for the ground carbon forming part of the positive pole of the generator. The upper disc 39 is also surrounded by a downwardly extending annular projection 41 and center hole 42 through which the carbon tube 37 extends for determining the location of the elements of the generator. Formed on the upper end of the carbon tube 37 is an enlarged head 43 which rests on the top surface of the disc 38. When the elements of the generator are positioned on the discs 38 and 39 they are held together in unit form by means such as nuts 44 threaded on the rod 37 which clamps the generator structure together.

Rigidly secured to the generator casing 34 is a negative pole contact 45. A negative wire is secured to the contact 45 and a positive pole wire 46 is secured to the pole head 43. The wires are held in the cable 20 which is connected to the lamps 12 and 13.

When the generator is placed in position in the well 14 the disc 29 rests on the annular support 28, providing a space 47 between the generator and the well to permit the waters of the salt seas to immerse the generator and to serve as an electrolytic fluid for energizing the poles of the generator. As the water passes through the space 47 it fills the space between the well and the generator and passes through the hole 48 in the casing or negative pole and surrounds the positive pole. This construction is one of the embodiments of the invention.

In operation the automatic electric safety lights for illuminating boats are permanently secured to the boat When the boat is lowered in the water as shown in Fig. 1 the water from the salt seas passes into the pipe 22 and thence to the well and the generator. Water immerses the positive and negative poles and serves as an electrolytic fluid for energizing the generator for lighting the lamps automatically when needed. When the boat is taken out of the water, the water in the well runs out, the lamps will automatically go out and the boat is replaced in position for storage.

What I claim as new and desire to secure by Letters Patent in the United States is:

In combination, a life boat for emergency use having a position-indicating means thereon for signalling continuously while the boat is in the water, a circuit in which the position-indicating means is permanently connected, and circuit control and energizing means permanently connected in circuit with said position-indicating means, and normally inactive and inoperative, for automatically coming into action and for unconditionally energizing the circuit immediately when the boat is dropped into the water, without the necessity of manually actuating any controls, regardless of the length of time that said energizing means has previously been in its inoperable condition, and for automatically deenergizing the circuit when the boat is hauled out of the water, the said control means comprising an enclosed compartment in said boat and having an opening at its bottom, for the influx of water to the water-level of the boat, a well in said compartment fixed to the wall thereof, and extending at least partly below the normal water-line of the boat, a pipe leading into the bottom of said well, a bushed connection communicating the said pipe in watertight manner with the opening in the bottom of the boat, so that the sea water can enter only into the well, a voltaic cell generator in said well having concentric electrodes spaced in fixed relation to each other, insulating discs at the top and the bottom of said cell serving to space the electrodes in said cell and also to space the cell with respect to said well, the bottom disc and the outer electrode having openings therein for the influx of sea water into said cell to serve as an electrolyte, leads permanently connected to said cell, a bushing in the top of said well, and a cable with which said leads are permanently connected and which extends through said last-mentioned bushing into permanent connection with said circuit, dropping of the boat into the water causing the influx of the water into the well and thence into the inter-electrode space of the cell to the normal water-line of the boat, thereby energizing the cell, and hence the circuit and the position-indicating means itself, and the removal of the boat from the water resulting in the flowing off of the electrolyte from the cell through the passages, and hence through the wall to the exterior, and consequent deenergization of the cell, without the necessity of breaking the fixed connections.

GUNNAR A. F. WINCKLER.